United States Patent [19]

Chevalier et al.

[11] Patent Number: 5,722,234

[45] Date of Patent: Mar. 3, 1998

[54] AIRCRAFT RAM JET ENGINE FOR SUPERSONIC AND/OR HYPERSONIC FLIGHT

[75] Inventors: Alain Chevalier, Asnieres les Bourges; Marc Bouchez, Bourges, both of France; Dmitri Davidenko, Moscou, Russian Federation; Valery Avrachkov, Moscow, Russian Federation; Vadim Levine, Moscou, Russian Federation

[73] Assignee: Aerospatiale Societe Nationale Industrielle, Paris, France

[21] Appl. No.: 679,959

[22] Filed: Jul. 15, 1996

[30] Foreign Application Priority Data

Jul. 13, 1995 [FR] France .................. 95 08496

[51] Int. Cl.⁶ ........................................ F02R 7/08
[52] U.S. Cl. ........................................ 60/270.1
[58] Field of Search .............. 60/270.1, 232, 60/242, 265, 267

[56] References Cited

U.S. PATENT DOCUMENTS

| | | |
|---|---|---|
| 4,081,137 | 3/1978 | Sutton et al. ............... 60/265 |
| 4,895,378 | 1/1990 | Newquist et al. . |
| 4,930,309 | 6/1990 | Hartman .................. 60/270.1 |
| 5,076,590 | 12/1991 | Steinetz et al. . |
| 5,165,227 | 11/1992 | Grieb . |
| 5,214,914 | 6/1993 | Billig et al. ............... 60/270.1 |

FOREIGN PATENT DOCUMENTS 2660972   10/1991   France .

Primary Examiner—Charles G. Freay
Attorney, Agent, or Firm—Fisher, Christen & Sabol

[57] ABSTRACT

An aircraft ram jet engine for supersonic and/or hypersonic flight, intended to operate over a wide range of speeds, of the type including: (a) an oxidant inlet; (b) at least one fuel injector; (c) a body in which the oxidant and fuel intended to be burned are mixed and the gases resulting from this combustion are channeled; and (d) at least one wall of the body consisting, at least partially, of plates (12) linked together by articulations. The ram jet engine comprises first fluid blowing means (19, 22), mounted in the region of the articulations (13), in order to cool them.

6 Claims, 2 Drawing Sheets

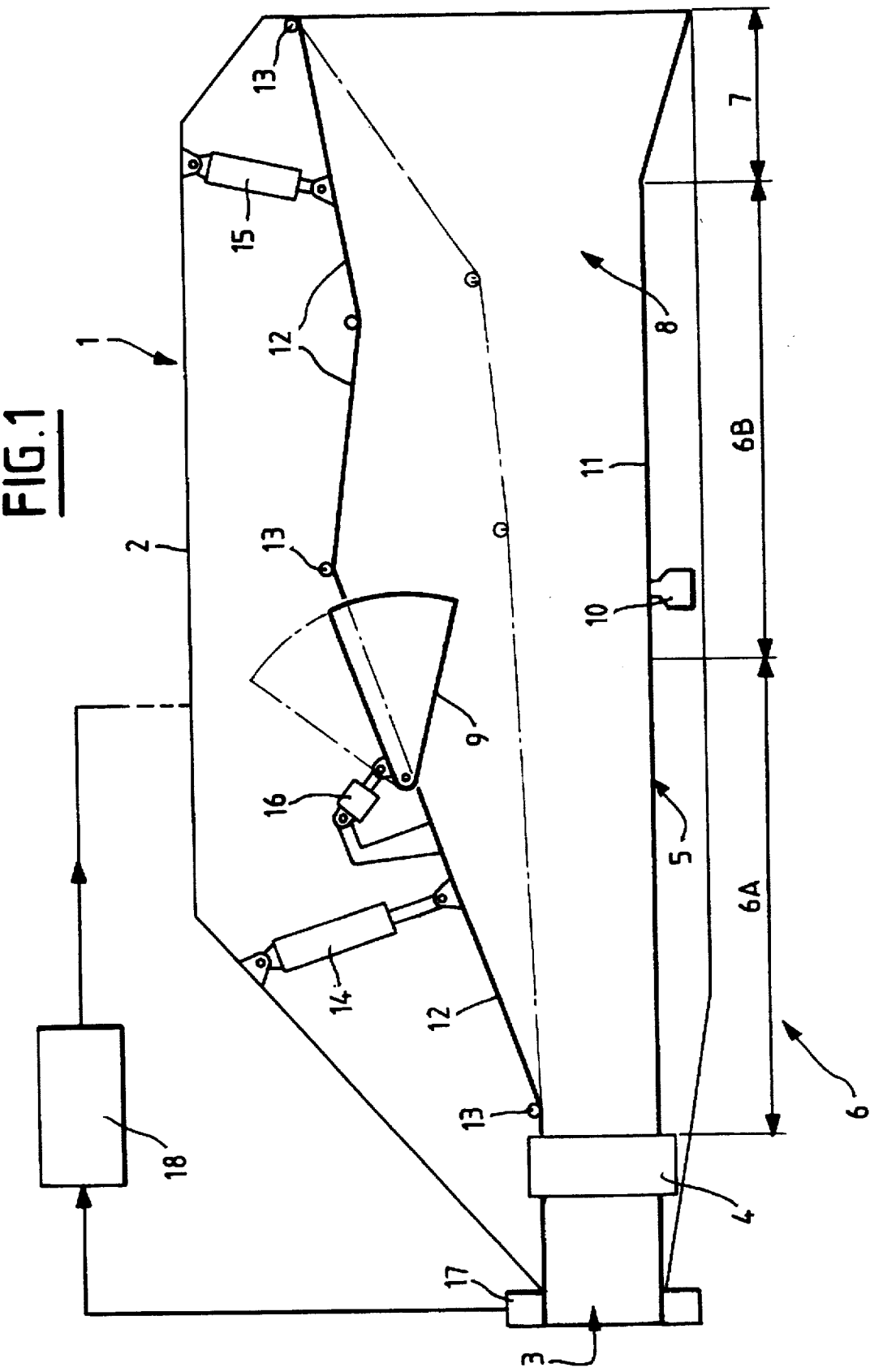

AIRCRAFT RAM JET ENGINE FOR SUPERSONIC AND/OR HYPERSONIC FLIGHT

The present invention relates to an aircraft ram jet engine for supersonic and/or hypersonic flight, intended to operate over a wide range of speeds. The range of speeds envisaged thus lies between Mach numbers of 1-2 to 15-20.

From French Patent Application No. 95 08417, filed on Jul. 12, 1995, a ram jet engine of this type is already known, comprising:

an oxidant inlet, at least one fuel injector, a ram jet engine body including, on the one hand, a combustion chamber portion, in which the oxidant and fuel intended to be burnt are mixed, and, on the other hand, a jet pipe portion, intended to channel the gases leaving the combustion chamber, said ram jet engine body, in the vicinity of the transition region between the combustion chamber and the jet pipe, having a changing geometry passing progressively from a convergent then divergent longitudinal section, for speeds corresponding to a low Mach number, to an at least substantially constant then divergent longitudinal section for speeds corresponding to a high Mach number.

As indicated in the abovementioned French patent, such a structure provides a progressive matching, as a function of the flight speed, of the geometry of the ram jet engine body in its entirety, but particularly in the vicinity of the transition between the combustion chamber and the jet pipe (nozzle throat) in order, in the wide range of speeds indicated, to retain optimal flight conditions, in particular a maximum thrust value independently of the external conditions (fuel consumption, aerodynamic pressure, profile of the oxidant (air) flow into the corresponding inlet). In other words, this in particular amounts to making the nozzle throat (convergent-divergent geometry) existing at "low". speed "disappear" so as eventually (at Mach number equal to or greater than about 8) to obtain a constant cross section of the combustion chamber, followed by the divergent cross section of the jet pipe.

In particular, in order to do so, in the case in which said ram jet engine body has the general shape of a duct of rectangular cross section, consisting of opposing pairs of walls, at least one of said walls includes plates articulated with respect to each other and, as the case may be, to the ends of said wall by respective spindles transverse to the longitudinal extension of the body of the ramjet engine, the relative position of at least some of said plates defining the changing geometry of the transition region between the combustion chamber and the jet pipe.

In this case, under the extreme conditions, particularly of temperature, in which such a ram jet engine is likely to operate, problems are inevitably posed relating to the correct operation of the articulations of said plates, in implementing said changing geometry.

The object of the present invention is to resolve these problems, and it relates to a ramjet engine of the type indicated, adapted to provide for correct operation of said articulations even under the most extreme conditions likely to exist when said ram jet is in service.

To that end, the aircraft ram jet engine for supersonic and/or hypersonic flight, intended to operate over a wide range of speeds, of the type including:

an oxidant inlet, at least one fuel injector, a body in which the oxidant and fuel intended to be burnt are mixed and the gases resulting from this combustion are channeled, at least one wall of said body consisting, at least partially, of plates linked together by articulations, in such a way as to cause the geometry of said body to change as a function of the operating speed of the ram jet engine, is noteworthy, according to the invention, in that it comprises first fluid blowing means, mounted in the region of said articulations, in order to cool them.

Hence, the correct operation of said articulations can be guaranteed, when the geometry of the body of the ram jet engine is controlled, even under the most extreme conditions, particularly of temperature, prevailing in the vicinity thereof. At the same time as cooling, the fluid film thus created provides sealing in the region of the articulations.

A similar problem can occur in the case in which said body includes two side walls arranged on either side, respectively, of said movable wall, that is to say that it exhibits a structure of generally rectangular cross section and that clearance exists between the movable wall and each of the side walls. In such a case, in order to guarantee the cooling and sealing in the region of said clearance, second fluid blowing means are provided, arranged at the lateral longitudinal ends of the articulated plates constituting said movable wall, in the clearance between the respective movable plate and each of said side walls.

In particular, said first fluid blowing means may each include a curved flexible strip, mounted at the end of a fluid inlet duct, integral with a plate and bearing against the rounded end of the adjacent plate by its convex face.

Moreover, said second fluid blowing means each may include a curved flexible strip the curvature of which is such that said strip bears, via its convex face, on the inner face of the respective side wall, while a fluid inlet duct opens out below said strip opposite said inner face.

Preferably, each articulation includes a spindle, transverse to the longitudinal extension of said body, integral with a plate by means of a bearing and of the adjacent plate by means of a cantilevered arm.

Advantageously, said fluid is a gas, particularly hydrogen.

The figures of the attached drawing will give a good understanding of how the invention can be carried out.

FIG. 1 is a view in longitudinal section of an embodiment of a ram jet engine according to the invention.

Figure 3:
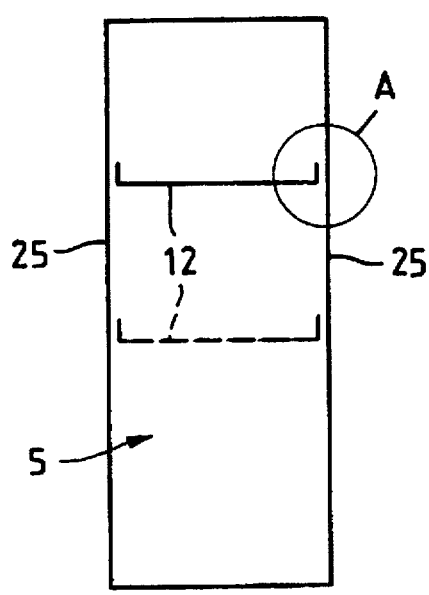

FIG. 3 very diagrammatically illustrates the respective configuration of the movable wall end of the side walls of the body of the ram jet engine.

Figure 4:
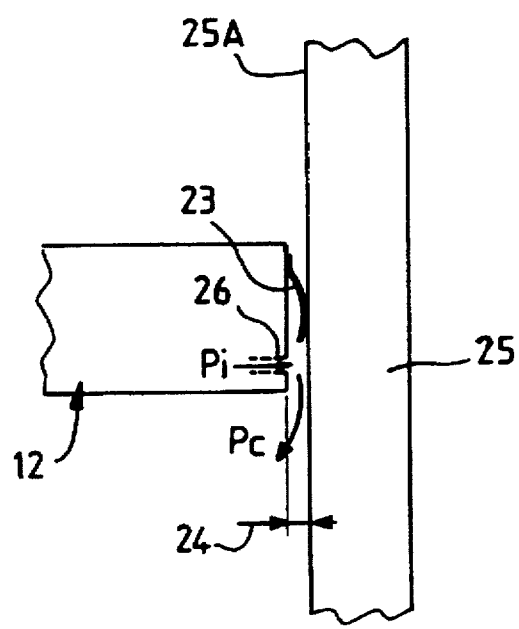

FIG. 4 is an enlarged view of detail A of FIG. 3.

The aircraft ramjet engine 1, shown in the figures, for supersonic and/or hypersonic flight, is intended to operate in a wide renge of speeds, that is to say from a Mach number of 1-2 to a Mach number of 15-20.

In a housing or casing 2, the ram jet engine 1 comprises:

an oxident inlet 3, particularly en air intake, upstream of the engine, installed under the underside of the fuselage of the aircraft associated with the ram jet engine, fuel injectors 4, provided upstream of the body 5 of the ram jet engine, said body 5 being broken down, as cenbe seen better in FIG. 1, into a combustion chamber portion 6 end a jet pipe portion 7, defining between them a transition region (or throat) 8, defined by a changing convergent-divergent geometry as a function of speed, that is to say of the Mach number, at which the ramjet engine is operating.

Moreover, combustion chamber 6 is itself subdivided into a diffusion region 6A, where supersonic combustion starts, and a chamber region 6B, where subsonic combustion takes place, behind the flame holders 9, end where supersonic combustion terminates, the injectors 4 distributing the fuel throughout the stream. An ignition device 10 is provided within the chamber 6B. It will be noted that, as fuel, it is possible to envisage the use of kerosene for the lowest flight Mach numbers (up to Mach 8) (with an admixture of hydrogen, if need be, so as to facilitate ignition of the ram jet engine and pluming of the jet), then hydrogen for the higher Mach numbers. Other fuels, such as methane, endothermic hydrocarbons, synthetic fuels, may also be employed for an engine of this type.

The body 5 of the ram jet engine overall exhibits the shape of a duct of rectangular cross section, consisting generally of four pairs of opposed walls, only the lower 11 and upper walls of which are visible in FIG. 1. For reasons of clarity, the corresponding side walls have not been represented on this drawing. In order to obtain the changing geometry which is the subject of the invention, the upper wall consists of plates 12 articulated to each other and to the ends of the wall by respective spindles 13 transverse to the longitudinal extension of the body 5 of the ram jet engine. In order to allow the relative articulation movement between the various plates 12, some of them are produced in two parts having a region of overlap (not represented in FIG. 1). It will be noted, however, that FIG. 1 of the French Patent Application No. 95 08417 illustrates such a configuration.

It is quite clear that such a configuration is not in any way limiting, both as far as the moving wall "chosen" is concerned, as well as the number of plates which constitute it. In particular, another wall, or several walls, of the ram jet engine could have been designed to exhibit such "mobility".

The mobility of the plates 12 is provided by a set of jacks 14, 15. Similarly, a jack 16 provides the positioning and, if appropriate, the retraction of each flame holder 9.

The operation of the ram jet engine assumes, moreover, that, having received a signal from a device 17 which measures thrust, which is an integral linear function of the operational efficiency of the ram jet engine, the on-board computer 18 of the aircraft constantly tends to achieve an optimal geometry of the passage part of the combustion chamber (body 5 of the ram jet engine) by virtue of the corresponding actuation of the control jacks 14, 15 of the articulated plates 12 of the upper wall. As a measuring device, the use of a thrust sensor can be envisaged, detecting the value of the longitudinal (axial) force generated while the ram jet engine is operating, that is to say the thrust. The value of the thrust is determined by the efficiency of the operating process: the efficiency of combustion and the total pressure recovery ratio (a function of the total hydraulic losses of the ram jet engine). The level of these two parameters depends on the geometry of the passage part (at each point of the trajectory) and on the efficiency of the stabilization means (flame holders 9) which in fact also represent a geometric control.

For further details concerning the operation of the ram jet engine under the various speed conditions in question, refer to the abovementioned French patent application.

Figure 2:
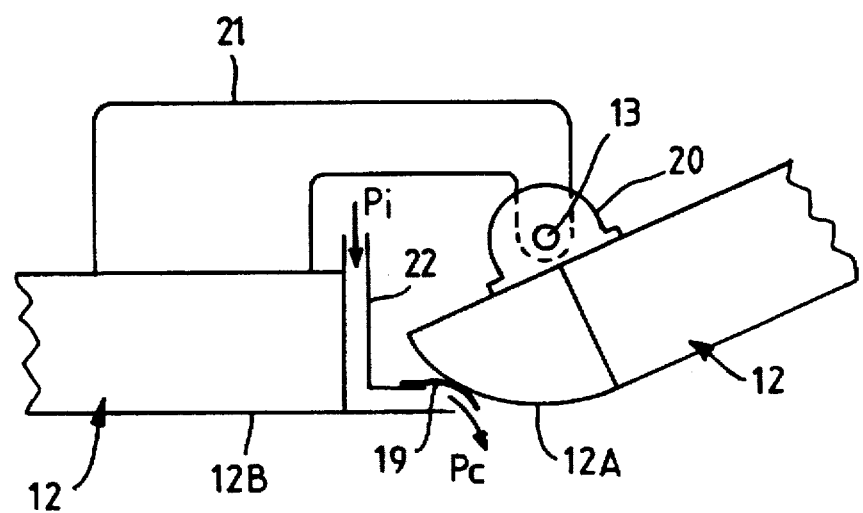
FIG. 2 shows, also in longitudinal section, but to a larger scale, the articulation between two plates belonging to the movable wall of the body of the ram jet engine.

Moreover, according to the invention, first fluid blowing means, including pressurizing valves, which are designed in the form of curved flexible strips 19, are mounted in the region of the articulations between two adjacent plates (FIG. 2). The articulation spindle 13, in this embodiment, is integral with a plate 12 by means of a bearing 20 and of the adjacent plate 12 by means of a cantilevered arm 21 provided within the housing 2. More precisely, the first plate mentioned, 12, has a rounded end 12A (on the combustion chamber side) capable of interacting with the corresponding flexible strip 19, the curvature of which is reversed with respect to that of said rounded end 12A, and which is mounted at the end of a duct 22, integral with the end 12B facing the adjacent plate 12, for fluid inlet, particularly gas, in particular hydrogen. The duct 22 extends, in a way which is not represented, into the housing 2 of the ram jet engine toward the corresponding fluid source.

Likewise, second fluid blowing means including pressurizing valves, also designed in the form of flexible strips 23, are mounted, in each case, at the lateral longitudinal ends of the plates 12, in the space or clearance 24 between the respective movable plate 12 and each of the two fixed side walls 25 bounding, with the lower and upper walls, the body 5 of the ram jet engine (FIGS. 3 and 4). The curvature of the strips 23 is such that they bear, by their convex face, on the inner face 25A of the respective side wall 25. A fluid intake duct 26 opens out below the strip 23 opposite the inner face 25A of the corresponding wall 25.

As already indicated, when the geometry of the passage part of the combustion chamber is controlled, problems can occur in the region of the articulations 3 and/or the clearances 24, working in an extreme environment, in particular as far as temperature is concerned, which problems are likely to entail a blockage, or at the very least a malfunction, of the articulations 3 and of the plates 12. In order to remedy this, gas is led in, through the ducts 22, 26, to the respective valves 19 and 23. At this moment, the following condition is reached: Pi>Pc, Pi being the pressure of the gas led in and Pc the pressure of the combustion chamber. The injection of gas, particularly of hydrogen, provides both, by virtue of the relatively "cold" fluid film thus generated in the region of the articulations between the adjacent plates and of the clearances between the plates and the side walls, the sealing and cooling of these regions, guaranteeing the correct operation of the components in question. In particular, the injected gas cools the inner surface of the end 12A of the plate 12 in contact with the strip 19 and generates a thermal protection screen at the junction between two adjacent plates.

Leakage gas, possibly penetrating the housing 2, is gathered and led into the combustion chamber by the injectors 5.

We claim:

1. An aircraft ram jet engine intended to operate over a wide range of supersonic and hypersonic speeds, comprising:

an oxidant inlet (3), at least one fuel injector (4), a body (5) in which the oxidant and fuel are mixed and combusted and the gases resulting from the combustion are channeled, at least one movable wall of said body (5) consisting, at least partially, of at least two movable plates (12), each plate having lateral ends, and at least one articulation (13), in such a way as to cause the geometry of said body to change as a function of the operating speed of the ram jet engine, wherein two adjacent plates (12) are linked together by an articulation (13) having a rounded end (12A) and an end facing said rounded end (12B): and first fluid blowing means (19, 22) disposed in the region of said articulations (13) in order to cool said articulations, each of said first fluid blowing means including:

a first curved flexible strip (19) having a convex face and supported by said end (12B) facing the rounded end, and bearing against said rounded end (12A) by said convex face, and a fluid inlet duct (22) blowing a fluid towards said one rounded end (12A) and said curved flexible strip (19).

2. The ram jet engine as claimed in claim 1, wherein each articulation includes a spindle (13), transverse to the longitudinal extension of said body, integral with a plate (12) by means of a bearing (20) and of the adjacent plate (12) by means of a cantilevered arm (21).

3. The ram jet engine as claimed in claim 1, wherein said fluid is a gas.

4. The ram jet engine as claimed in claim 3, wherein said gas is hydrogen.

5. The ram jet engine as claimed in claim 1, in which said body (5) includes two side walls (25) arranged with a clearance on either side, respectively, of said movable wall, comprising at least one of a second fluid blowing means (23, 26) arranged at the lateral ends of the movable plates (12) constituting said movable wall, in said clearance (24) between the movable plate (12) and each of said side walls (25).

6. The ram jet engine as claimed in claim 5, wherein said second fluid blowing means each include a second curved flexible strip (23) with a convex face, the curvature of said second flexible strip (23) being such that said second flexible strip bears, via its convex face, on an inner face (25A) of the respective side wall (25), while a fluid inlet duct (26) opens out opposite said inner face (25A) of the side wall.

* * * * *